Figure 1:
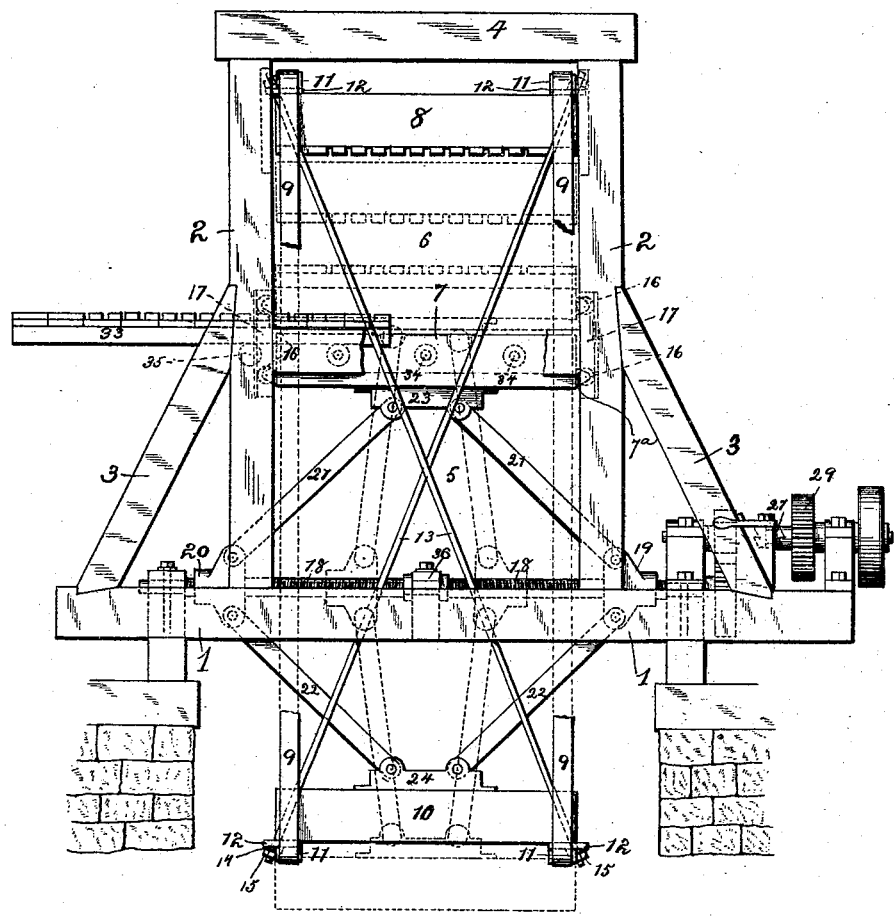

(No Model.)  C. G. WILSON.  4 Sheets—Sheet 1.
BALING PRESS.

No. 494,267.  Patented Mar. 28, 1893.

Attest:  Inventor:
Walter Tamanes  Carlos G. Wilson
Geo. E. Cruse  By Knight Bros
  Attys.

(No Model.) 4 Sheets—Sheet 3.

C. G. WILSON.
BALING PRESS.

No. 494,267. Patented Mar. 28, 1893.

Attest:
Walter Tammariss
Geo. E. Cruse

Inventor:
Carlos G. Wilson
By Knight Bros.
Attys.

(No Model.)  4 Sheets—Sheet 4.
C. G. WILSON.
BALING PRESS.
No. 494,267.  Patented Mar. 28, 1893.
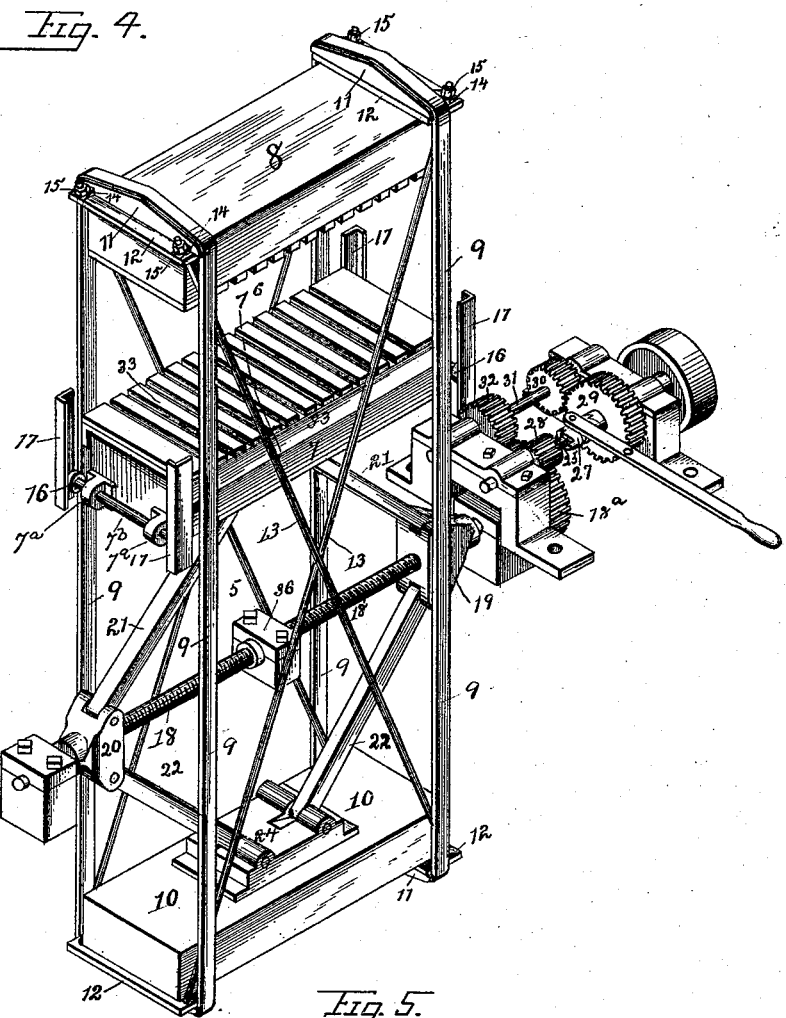
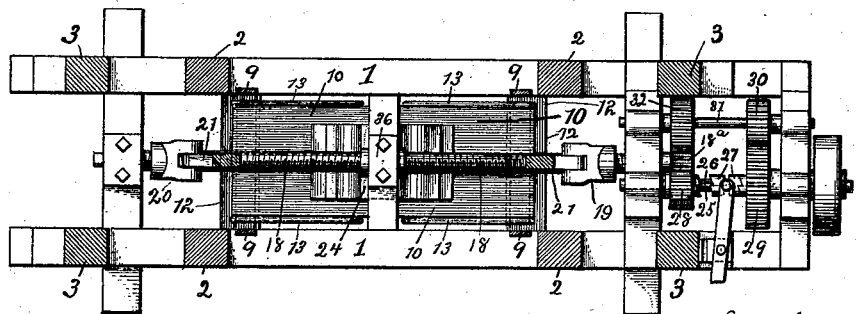
Attest
Walter Jamarise
Geo. E. Cruse
Inventor
Carlos G. Wilson,
By Knight Bros
Attys.
THE NORRIS PETERS CO., PHOTO-LITHO., WASHINGTON, D. C.

UNITED STATES PATENT OFFICE.

CARLOS G. WILSON, OF MILLEDGEVILLE, GEORGIA.

BALING-PRESS.

SPECIFICATION forming part of Letters Patent No. 494,267, dated March 28, 1893.

Application filed December 26, 1891. Serial No. 416,192. (No model.)

*To all whom it may concern:*

Be it known that I, CARLOS G. WILSON, a citizen of the United States, and a resident of Milledgeville, in the county of Baldwin and State of Georgia, have invented a certain new and useful Improvement in Baling-Presses, of which the following is a full, clear, and exact specification.

My invention relates particularly to cotton presses and especially to that class of presses in which very heavy power is developed especially toward the termination of the stroke so as to compress the material into the smallest possible dimensions in order to economize space in storage and shipment.

In order to illustrate a suitable kind of press to which my present improvement may be applied I refer to the toggle-screw press represented in Letters Patent No. 413,595 granted to me October 22, 1889, and will represent this in the present application as a suitable embodiment of my invention. My present improvements however are not confined to any particular kind or description of press.

In cotton "compresses" or presses in which the bale is reduced to its final small dimensions for transportation to distant points and especially in cases where the follower is not guided in a vertical line or secured in rigid connection to the operating device much difficulty exists in securing a uniform parallel movement of the follower, by reason of inequality which exists in the quantity of material over the respective ends of the follower. In presses constructed upon any toggle joint plan as shown in my patent No. 413,595 the practical difficulty in securing a uniform parallel movement of the followers if one end of the bale contains an excess of cotton has a tendency to throw the followers out of line. To obviate this difficulty is the object of my present improvements.

To this end my invention consists first in combining with one follower working between the standards of a toggle joint press a system of guides or ways and rollers by which the lower follower is secured against lateral movement and is thereby compelled to move in a straight vertical path, and second in combining the upper follower with the bottom cross head by which it is moved by means of diagonal tie rods which brace the said follower securely against either oscillating or lateral movement under strain.

Figure 2:
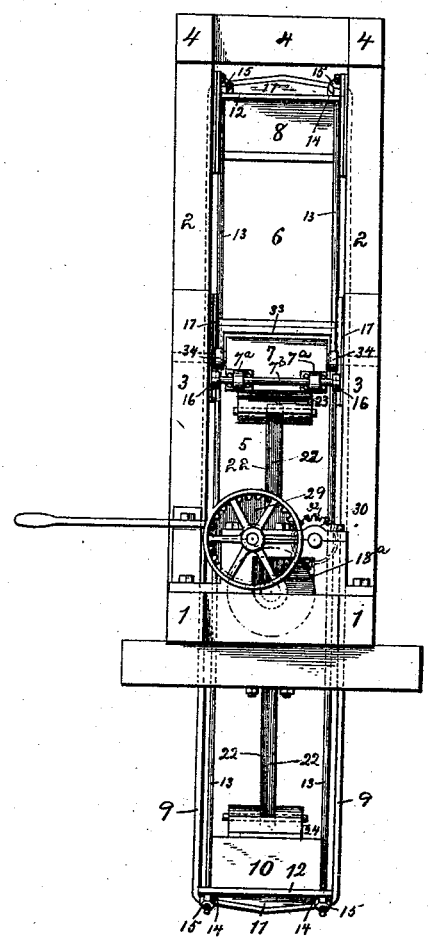
Figure 3:
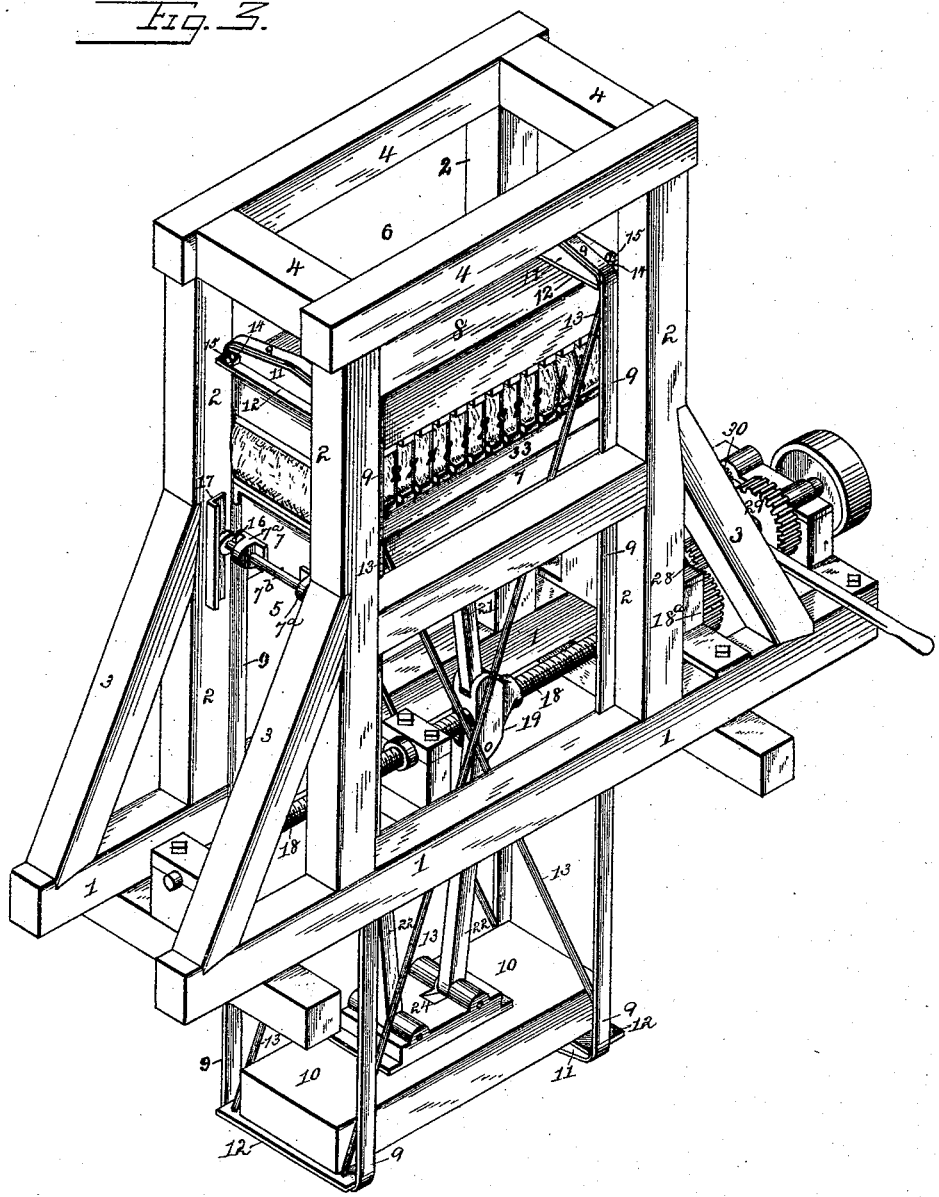

In order that my invention may be fully understood I will proceed to describe it with reference to the accompanying drawings which illustrate my improvement embodied in a press of the general construction hereinbefore referred to, in which Figure 1 is a front elevation of the working parts of the press, showing the advanced positions of the followers in dotted lines. Fig. 2 is a side view. Fig. 3 is a perspective view showing the press-box open for the tieing and removal of the bale. Fig. 4 is a perspective view of the working parts omitting the frame. Fig. 5 is a horizontal section, showing the lower working parts in plan view.

1 represents the horizontal base frame of the press on which are mounted standards 2, securely braced by oblique struts 3, and connected at the top by horizontal beams 4.

5, 6 represent respectively the lower and upper portions of the press box within the standards of which the lower follower 7 and upper follower 8 move vertically toward and from each other. The upper follower 8 is connected by strong iron straps 9 to a cross-head 10 at the bottom of the press. Beneath the straps 9 where they pass over the follower 8 and under the cross-head 10 are smooth forged blocks 11 bearing against a bolster 12 which projects beyond or overlaps the standards 2, or suitable guides thereon so as to prevent the follower from tumbling or falling over sidewise. These bolsters 12 also furnish anchorages for diagonal tie-rods 13 which extend from one end of the upper follower 8 to the opposite end of the lower cross-head 10, each end of the follower being thus tied to the opposite end of the cross head in order to confine the follower securely in horizontal position and restrict it to parallel movement. The attachment and bearing of the diagonal tie-rods 13 upon the follower 8 and cross-head 10 respectively is by means of angle-washers 14 and nuts 15 said washers bearing against the bolster 12.

In order to confine the lower follower 7 to a vertical line of movement and thereby restrict it to parallel position and movement in all parts of the stroke it is provided at its ends with journal brackets 7ᵃ carrying shafts 7ᵇ provided with rollers 16 traveling on vertical guides or ways 17 formed of angle-iron.

The simultaneous movement of the followers 7, 8, to and from each other is effected as in my patent No. 413,595, before referred to by means of a horizontal screw 18 formed with right and left threads at its respective ends and mounted in suitable bearings in the bottom of the press. On the right and left threads of this driving screw are nuts 19, 20, in which are stepped or articulated toggle-bars 21 connecting said nuts with the lower follower 7 and toggle-bars 22 connecting them with the bottom cross-head 10. The connection of the toggle-bars 21 and 22 to the follower 7 and cross-head 10 respectively is by means of heavy cast bed-plates 23, 24, in which the extremities of said toggle-bars have their bearings.

The rotation of the driving-screw 18 in either direction to advance or retract the followers is effected by means of a counter-shaft 25 having a spline 26 and a clutch head 27, with right and left clutch faces at its extremities adapted to engage respectively with a corresponding clutch face on one or other of the pinions 28, 29 which are mounted loosely on the said counter-shaft so that either may derive rotation from the clutch when it is set in gear therewith. The pinions 28, 29, are secured against endwise movement on the shaft by flanged collars as shown. The pinion 28 may gear directly with the driving pinion 18ᵃ on the driving screw 18 to impart the forward rotation or feed movement thereto when the clutch head is in gear with said pinion. The pinion 29 of large diameter gears with a pinion 30 keyed upon a second counter-shaft 31 on which is also keyed a pinion 32 gearing with the driving pinion 18ᵃ so as to impart a more rapid reverse movement thereto, when the clutch-head is in gear with the pinion 29, for retracting the followers.

The lower follower 7 has no grooves for the bale-ties, these being provided in a movable platform 33, for inserting the bale and removing it between the movable followers of the press and lifted and lowered with the lower follower, and which travels on rollers 34 journaled on the cross-beams and on rollers 35 journaled on the uprights of the frame of the press.

The driving screw 18, is provided with a firm center bearing 36, to sustain any lateral thrust of the screw as well as for support.

For use with light motive power the relative diameters of the pinion 28 on the driving shaft 25 and the gear 18ᵃ on the screw 18 are as one to four. This gives a capacity of fifteen bales per hour. These proportions I vary according to the power of the engine and the number of bales to be compressed in a given time.

An engine of sufficient capacity may be coupled directly to the driving screw so as to rotate this at an equal velocity with the driving shaft.

It will be apparent that with a toggle joint press constructed as herein shown and described any tipping or unequal movement of the respective ends of the lower follower must be accompanied with an endwise or lateral movement and as this is prevented by the guide rollers 16 restricting the follower to a straight vertical path it will be apparent from the foregoing description that my improvement effectually prevents such irregular movement of the follower even though its ends be opposed by unequal quantities or density of material under pressure. While the lower follower is thus compelled to run true and parallel, notwithstanding the uneven packing of the bale, the upper follower is made to run true by the diagonal tie-rods 13 and the vertical straps 9, by which the upper follower 8 and the lower cross-head 10 are connected.

Having thus described my invention, the following is what I claim as new therein and desire to secure by Letters Patent:

1. The combination of the upper follower 8 lower cross-head 10, draft connections 9 and diagonal tie-rods 13, by which the upper follower and the lower cross head are secured together and toggle bars for imparting vertical movement to said cross-head and follower, as explained.

2. The combination of the frame 1, 2, 3 the followers 7, 8, guided thereon, rollers 16, vertical guides 17, lower cross-head 10, vertical connections 9 and diagonal ties 13, between said cross-head and the upper follower 8, driving screw 18, and toggle-bars 21, 22, for imparting movement to the followers from the driving screw 18, as explained.

3. The combination of the lower cross-head 10, upper follower 8, connecting straps 9, bearing blocks 11, and bolsters 12, substantially as described.

4. The combination of the upper follower 8, lower cross head 10, diagonal tie-rods 13, extending from the follower to the cross head and angle-washers 14 and nuts 15, by which said tie-rods are secured to the follower, and cross-head as explained.

5. The improved screw and toggle-joint baling-press constructed substantially as herein described with horizontal driving right and left screw 18, right and left nuts 19 and 20 thereon, the lower and upper followers 7, 8, lower cross head 10 the toggle-bars 21 and 22, the draft-connections 9, and diagonal ties 13 between said upper follower and lower cross-head, and rollers 16, and vertical guides 17 by which the follower 7 is confined to a vertical path; as and for the purpose explained.

CARLOS G. WILSON.

Witnesses:
GEO. G. CRAWFORD,
JNO. M. BAYNE.